United States Patent
Sasano

(10) Patent No.: US 8,070,430 B2
(45) Date of Patent: Dec. 6, 2011

(54) RESINOUS SHROUD AND MANUFACTURING METHOD OF THE SAME

(75) Inventor: Norihisa Sasano, Yatomi (JP)

(73) Assignee: Denso Corporation, Kariya (JP)

( * ) Notice: Subject to any disclaimer, the term of this patent is extended or adjusted under 35 U.S.C. 154(b) by 574 days.

(21) Appl. No.: 12/313,727

(22) Filed: Nov. 24, 2008

(65) Prior Publication Data

US 2009/0148281 A1 Jun. 11, 2009

(30) Foreign Application Priority Data

Dec. 6, 2007 (JP) ................... 2007-316289

(51) Int. Cl.
*F01D 1/00* (2006.01)
*F01D 1/02* (2006.01)
(52) U.S. Cl. ........................ 415/200; 415/220
(58) Field of Classification Search ............ 415/220, 415/200
See application file for complete search history.

(56) References Cited

U.S. PATENT DOCUMENTS

| | | | | |
|---|---|---|---|---|
| 5,427,502 A * | 6/1995 | Hudson | ................ | 415/211.1 |
| 6,938,727 B2 * | 9/2005 | Xia | ................ | 181/224 |
| 7,008,180 B2 * | 3/2006 | Fujimori et al. | ............ | 415/121.2 |
| 2002/0150478 A1 * | 10/2002 | Aoki | ............................ | 417/44.1 |
| 2003/0094010 A1 * | 5/2003 | Katatani et al. | ............... | 62/259.1 |
| 2006/0266309 A1 * | 11/2006 | Lang et al. | ................. | 123/41.49 |

FOREIGN PATENT DOCUMENTS

| | | |
|---|---|---|
| JP | 10-82319 | 3/1998 |
| JP | 10-238825 | 9/1998 |
| JP | 2005-81611 | 3/2005 |
| JP | 2007-327442 | 12/2007 |

OTHER PUBLICATIONS

Office action date Feb. 16, 2010 in corresponding Japanese Application No. 2007-316289.

* cited by examiner

*Primary Examiner* — Nitin Parekh
(74) *Attorney, Agent, or Firm* — Harness, Dickey & Pierce, PLC

(57) ABSTRACT

A resinous shroud includes a resinous wall portion formed between a portion corresponding to a casing and a portion corresponding to a retaining member in a shroud portion when a resin material is filled from a gate portion. Thereby, a flow of the resin material to the portion corresponding to the casing from a portion corresponding to the gate portion can be dispersed by the resinous wall portion. Alternatively, an extended resinous wall portion may be formed in place of the resinous wall portion. Therefore, welds generated at the casing can be made small, and cambers generated at the casing can be suppressed.

9 Claims, 3 Drawing Sheets

RESINOUS SHROUD AND MANUFACTURING METHOD OF THE SAME

CROSS REFERENCE TO RELATED APPLICATION

The present application is based on Japanese Patent Application No. 2007-316289 filed on Dec. 6, 2007, the disclosure of which is incorporated herein by reference.

FIELD OF THE INVENTION

The present invention relates to a resinous shroud for a fan and an air cleaner, and a method of manufacturing a resinous shroud.

BACKGROUND OF THE INVENTION

In a resinous shroud described in JP-A-10-238825, a casing used as a container of an air cleaner and a shroud ring portion for holding a fan are integrally formed to be adjacent each other.

When the resinous shroud including the air cleaner casing is molded using a resin material, a gate portion for filling the resin material is disposed at a center portion of the shroud ring portion and at a predetermined end portion of the air cleaner casing. The resin material flowing to a molding die of the casing from the center portion of the shroud ring portion joins windingly the resin material flowing in the molding die of the casing in one direction so that welds generate at a junction. The larger a quantity of the resin materials joined from two directions becomes, the bigger welds generates. Thereby, deformation such as cambers generates in the casing after the shroud was formed. By such the cambers in the casing, the casing is difficult to be fitted to an air cleaner element and/or a cover member, and thereby it becomes difficult for an appropriate assembling and a sealing to be performed.

SUMMARY OF THE INVENTION

It is an object of the present invention to provide a resinous shroud, which can reduce deformation in a resin molding.

It is another object of the present invention to provide a resinous shroud including a shroud portion for accommodating a fan and a casing for accommodating a filter element.

It is further another object of the present invention to provide a manufacturing method of a resinous shroud.

According to a first aspect of the present disclosure, a resinous shroud for a fan and an air cleaner, the resinous shroud includes a retaining portion for retaining a driving portion for driving the fan; a plurality of stay portions extended from the retaining portion radially outside; a ring portion configured to hold the fan, the ring portion being connected to an end portion of the plurality of stay portions extended from the retaining portion; an air intake portion expanded from an outer periphery of the ring portion; a casing configured to hold therein a filter element of the air cleaner; and a resinous wall portion extending from the retaining portion to the ring portion. The casing is adjacent to the ring portion and integrated with the air intake portion. The retaining portion is molded from a resin material filled by using a first gate portion positioned at a portion corresponding to a center portion of the retaining portion. The casing is molded from the resin material filled by using a second gate portion positioned at a portion corresponding to an end portion of the casing. The resinous wall portion and a part of the plurality of stay portions are formed by the resin material flowing from the first gate portion to a portion corresponding to the casing in a resin molding.

In the above configuration, the welds generated at the casing can be made small, and the cambers generated at the casing can be suppressed.

According to a second aspect of the present disclosure, a resinous shroud for a fan and an air cleaner, the resinous shroud includes a retaining portion for retaining a driving portion for driving the fan; a ring portion configured to hold the fan; a plurality of connection portions for connecting the ring portion and the retaining portion; an air intake portion expanded from an outer periphery of the ring portion; and a casing configured to hold therein a filter element of the air cleaner. The plurality of connection portions is extended from the retaining portion radially outside to the ring portion. The casing is adjacent to the ring portion and integrated with the air intake portion. The number of the plurality of connection portions included in a range of plus or minus 60 degrees with respect to a reference line (A-A) as a center line is three or more on a plane parallel to the ring portion including the reference line (A-A), the reference line (A-A) being defined by connecting the center portion of the retaining portion and the casing in a shortest path.

In the above configuration, the welds generated at the casing can be made small, and the cambers generated at the casing can be suppressed.

According to a third aspect of the present disclosure, a method for manufacturing a resinous shroud including a shroud portion and a casing, the method includes injecting a resin material into a molding die from a first gate portion and a second gate portion of the molding die; forming a plurality of stay portions and a resinous wall portion of the shroud portion by extending the resin material injected from the first gate portion radially outside from the first gate portion, and forming the casing by flowing the resin material injected from the second gate portion toward a portion corresponding to a second surface of the casing. The first gate portion is positioned at a portion corresponding to a center portion of a retaining portion of the shroud portion and the second gate portion is positioned at a portion corresponding to a first surface of the casing. The second surface is opposite from the first surface. The resin material injected from the first gate portion flows into portions corresponding to the resinous wall portion and a part of the plurality of stay portions so that the resin material injected from the first gate portion is dispersed.

In the above configuration, the welds generated at the casing can be made small, and the cambers generated at the casing can be suppressed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
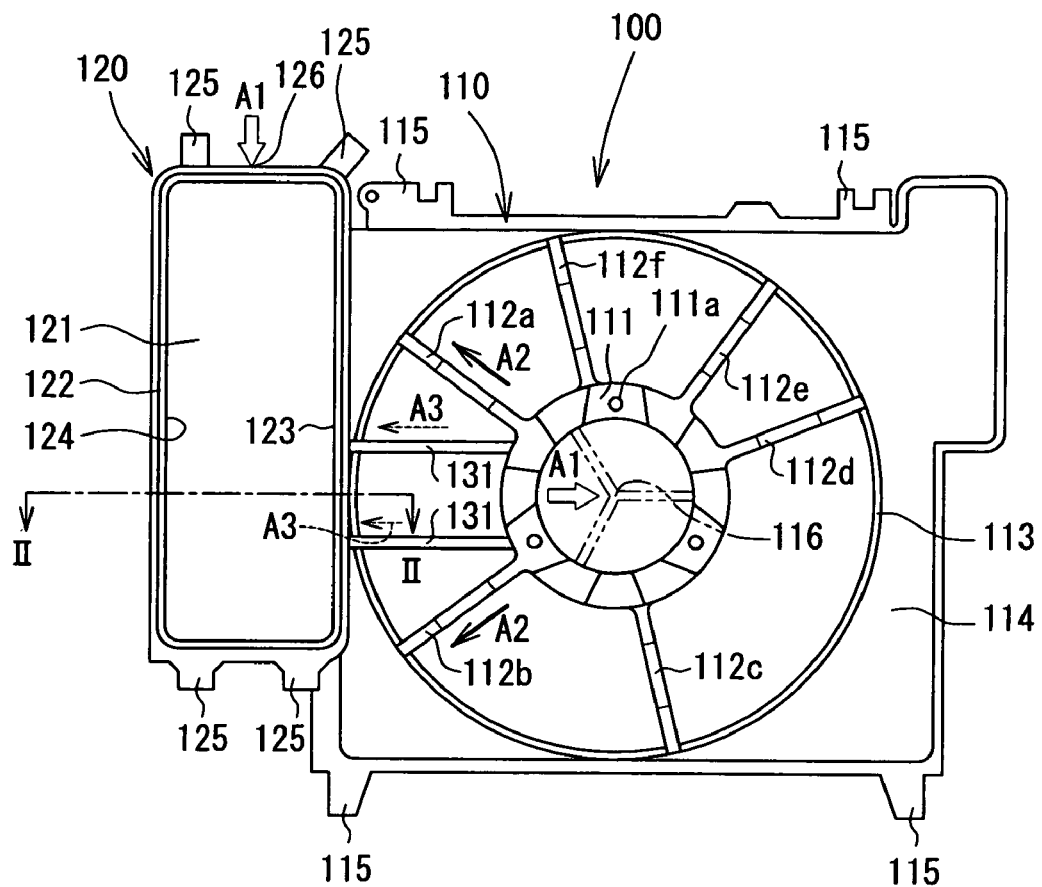
FIG. 1 is a front view showing a casing-integrated shroud according to a first embodiment of the present invention.

Firstly, a first embodiment of the present invention will be described with reference to FIG. 1 to FIG. 3. A casing-integrated shroud 100 made of resin (hereinafter referred to as a shroud) of the first embodiment is used for an electrical blower mounted to a radiator (not shown in drawings) of a vehicle engine.

The electrical blower is provided such that an electrical motor (a driving portion), which is not shown in drawings, is attached to a motor retaining portion 111 of the shroud 100, and further, a fan 200 for blowing air (shown in FIG. 2) is attached to a shaft of the electrical motor. Attaching portions 115 are disposed at four corners of an air intake portion 114, for example. The electrical blower is fixed at the engine side of the radiator by using the attaching portions 115, and is located to blow air for cooling to a core portion of the radiator. Here, the electrical blower is a suction type electrical fan for drawing air to be blown toward the engine from a grille of the vehicle, that is, toward the fan 200 from the core portion of the radiator.

The shroud 100 in the electrical fan includes a shroud portion 110 and a casing 120. The shroud 100 is made of polypropylene material including 25% to 30% fibrous glass, for example. The shroud portion 110 and the casing 120 are integrally formed by injection molding.

The motor retaining portion 111, which has approximately a ring shape, is formed at a center portion of the shroud portion 110 to retain and support the electrical motor. In the motor retaining portion 111, multiple holes 111a for attaching are provided circumferentially, such that screws for fixing the electrical motor are inserted.

A center portion of the motor retaining portion 111 corresponds to a position of a gate portion 116 for filling a resin material when the shroud portion 110 is resin-molded. The gate portion 116 is located at a radial inside of the motor retaining portion 111, and multiple runners (e.g., three runners shown by a two-dotted chain line in FIG. 1) of the gate portion 116 extend radially outside. The multiple runners of the gate portion 116 can be located equiangularly in a circumferentially direction. Thus, the resin material can be filled from a portion corresponding to the center portion of the shroud portion 110 to an entire circumference of the air intake portion 114. Generally, the gate portion 116 is located in a molding die for molding the shroud 100. The runners of the gate portion 116 are removed afterward, and prints of the gate are remained at multiple portions of the radial inside of the motor retaining portion 111 in the shroud portion 110 after the resin molding.

Multiple motor stay portions 112a to 112f (e.g., six stay portions in the example of FIG. 1) are extended from an outer diameter side (outer peripheral side) of the motor retaining portion 111 radially outside. The end portions of the motor stay portions 112a to 112f are connected to one end portion of a ring portion 113 on an opening side in an axial direction. The motor stay portions 112a to 112f are used as support members for supporting the motor retaining portion 111 strongly. The motor stay portions 112a to 112f have a U-shape in a cross section perpendicular to the longitudinal direction, which is vertically long and has a narrow width, for example. The motor stay portions 112a and 112b among the motor stay portions 112a to 112f are disposed to extend toward the casing 120 described below.

The ring portion 113 is a ring-shaped member having a flat and cylindrical space in which the fan 200 is accommodated. The air intake portion 114, which is expanded like a smooth skirt, is formed from other end portion opposite from the one end portion of the opening side, toward the core portion of the radiator such that an outer shape of the air intake portion 114 becomes approximately a rectangular shape at the core portion of the radiator. The air drawn by the fan 200 is fed from the core portion of the radiator to the fan 200 via the air intake portion 114.

Figure 2:
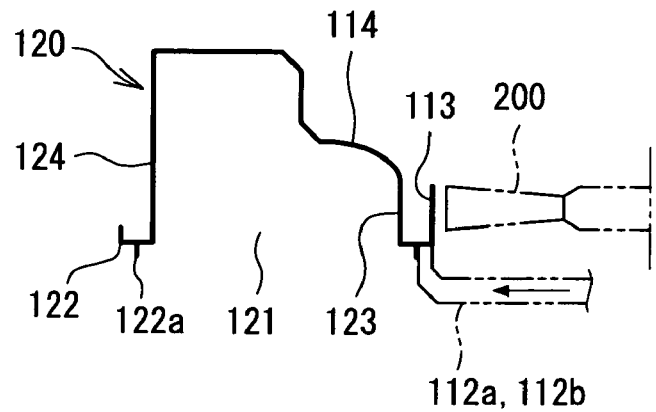
FIG. 2 is a cross sectional view showing the casing-integrated shroud, taken along line II-II in FIG. 1.

The casing 120 is a semi-container body such as a box-shaped body having a vertically long rectangular parallelepiped including an opening 121 at one side, and disposed adjacent to a side of the ring portion 113 (a left side in FIG. 1). The opening 121 opens toward a downstream side (a front side of a paper in FIG. 1) of the air blown by the fan 200. A flange portion 122 projected along the one side (a virtual surface) of the opening 121, is formed on an outer periphery of the opening 121. A projecting portion 122a for sealing, which is projected slightly from the flange portion 122 is formed on the flange portion 122 as shown in FIG. 2.

Figure 3:
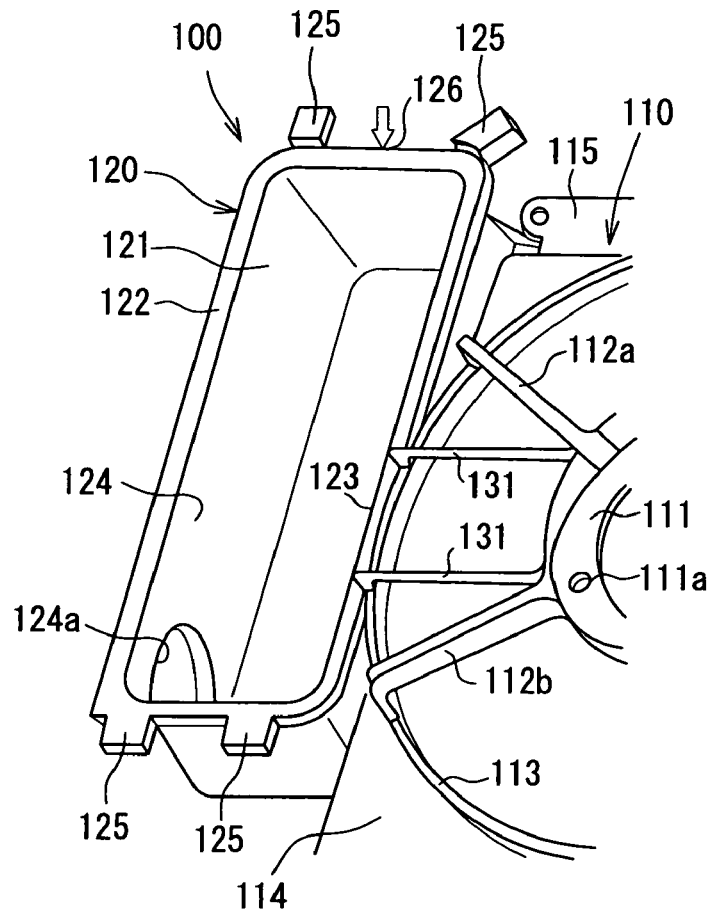
FIG. 3 is a perspective view showing a resinous wall portion in FIG. 1.

As shown in FIG. 3, the casing 120 has a side wall 123 adjacent to the ring portion 113, and a side wall 124 opposite to the side wall 123. A circular suction opening 124a is formed at a lower side in the side wall 124 of the casing 120, and an outside and an inside of the casing 120 communicate with each other via the circular suction opening 124a. Rectangular plate-like connection portions 125 are provided to be connected with cover member (cap portion) for closing the opening 121, which are not shown in drawings. The connection portions 125 are formed to be projected approximately at four corners of the flange portion 122. A bottom wall, which is opposite from the opening 121, of the casing 120 is connected to the air intake portion 114.

Upper center portion of the flange portion 122 of the casing 120 corresponds to an arrangement position of a gate portion 126 for filling the resin material when molding the casing 120. When the casing 120 is molded, the resin material is filled and jetted toward the lower side of the casing 120 from the gate portion 126. Generally, the gate portion 126 is located at the arrangement position in the molding die for forming the shroud 100, and prints of the gate are remained at the upper center portion of the casing 120 after the resin molding.

In addition, a filter element for collecting and removing dust and the cover member (cap portion) for closing the opening 121, which are not shown in drawings, are assembled and connected to the casing 120 so that an air cleaner is formed. That is, an outer periphery of the filter element is disposed to be along a surface of the flange portion 122, and the cap portion, which is a semi-container body similar to the casing 120, is connected to the connection portions 125 of the casing 120 while the outer periphery of the filter element is interposed between the cap portion and the casing 120. A discharge opening is formed at an upper portion of the cap portion so that air after passing through the filter element is discharged from the discharge opening.

A suction duct, which opens in the vicinity of the grille of the vehicle, is connected to the suction opening 124a of the casing 120, and an intake air duct, which is connected to an air intake side of the engine, is connected to the discharge opening. When the engine is operated, the air intake side becomes a negative pressure, and external air (air) is drawn into the casing 120 from the suction duct. Then, dust in the air is removed when the air passes through the filter element, and the filtered air flows into the cap portion and supplied to the air intake side of the engine from the discharge opening.

In the present embodiment, two resinous wall portions 131 are formed as connection portions connected between the motor retaining portion 111 in the shroud portion 110 and the casing 120. Each of the resinous wall portions 131 is a round bar-shaped member having a circular cross-sectional shape. Each of the two resinous wall portions 131 is extended to the casing 120 from the motor retaining portion 111 at a vicinity of the base portions of the motor stay portions 112a and 112b. The resinous wall portions 131 extending from the motor retaining portion 111 are connected to the ring portion 113 and the side wall 123. Connection points of the resinous wall portions 131 with the ring portion 113 are set at positions to be substantially equal distance between a connection point of the motor stay portion 112a to the adjacent ring portion 113 and a connection point of the motor stay portion 112b to the adjacent ring portion 113 in the circumferential direction. That is, the resinous wall portions 131 are separated from the adjacent motor stay portions 112a and 112b by an approximately equal distance in the circumferential direction.

The resinous wall portions 131 are members different from the supporting members such as the motor stay portions 112a to 112f for supporting the motor retaining portion 111 strongly. That is, the resinous wall portions 131 are formed to absorb an excess resin material so as to accurately form the shroud 100. Therefore, the resinous wall portions 131 are formed additionally and generally not used as a supporting member for supporting the fan 200. The resinous wall portions 131 are formed by runner portions, through which the resin material passes while the shroud 100 is molded, and remained as rod-shaped resinous wall portion after the shroud 100 is molded. With respect to the shape of the resinous wall portion 131, different configuration may be taken. The cross-sectional shape is not limited to the circular, and an elongated shape, an ellipsoidal shape, and a streamline wing shape may be used. In addition, size of the resinous wall portion and the number of the resinous wall portion may be selected arbitrary.

The shroud 100 is molded by using a resin material as described below. The molten resin material is injected into the gate portions 116 and 126 with the molding die closed (an outline arrow A1 in FIG. 1). The resin material injected from the gate portion 116 flows to extend radially outside from a portion corresponding to the center portion of the shroud portion 110. That is, the resin material flows from a portion corresponding to the motor retaining portion 111 and passes through the portions corresponding to the motor stay portions 112a to 112f. Then, the resin material is filled in portions corresponding to the ring portion 113 and the air intake portion 114 so that the shroud portion 110 is formed.

The resin material injected from the gate portion 126 flows in a molding die toward a portion corresponding to the lower side of the casing 120 from a portion corresponding to the upper center portion of the casing 120 so that the casing 120 is formed integrally with the air intake portion 114.

After a predetermined cooling period, the molding die is opened and the molded shroud 100 is taken out from the molding die. Then, unnecessary runner portions shown by the two-dotted chain line in FIG. 1 are removed so that a final product is obtained.

If the resinous wall portion 131 is not provided as a comparative example, the resin material flows into the portions corresponding to the casing 120 from the portion corresponding to the center side of the shroud portion 110 through the portions corresponding to the motor stay portions 112a and 112b as shown by solid arrows A2 in FIG. 1, and is joined with the resin material, which is filled for forming the casing 120. Therefore, bulky welds may be generated at a substantially center position between the motor stay portion 112a on the ring portion 113 and the motor stay portion 112b on the ring portion 113. Furthermore, bulky cambers, which make the casing 120 expand, may be generated at the side wall 123 of the casing 120.

Since the resinous wall portion 131 are formed in the present embodiment, the flows of the resin material are added as shown by dashed arrows A3 in FIG. 1 so as to form the additional resinous wall portions 131, and the resin material, which flows into a portion corresponding to the casing 120 from a portion corresponding to the center portion of the shroud portion 110, can be dispersed to join the resin material, which is filled in a portion according to the casing 120 when the shroud 100 is molded. Therefore, the welds generated at the casing 120 can be made small, and the cambers generated at the casing 120 can be suppressed.

According to the quantitatively measuring with use the actual product, in the casing of the comparative example, the camber of 0.8 mm at a maximum is generated on the side wall. In contrast, in the casing of the present embodiment, the size of the camber can be suppressed to be 0.35 mm at a maximum.

Second Embodiment

Figure 4:
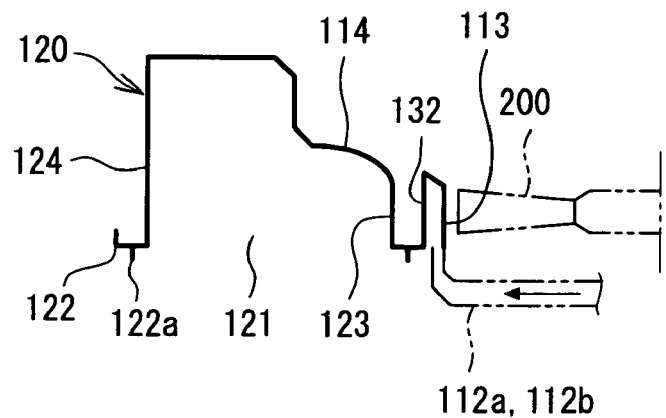
FIG. 4 is a cross sectional view showing an extended resinous wall portion of a casing-integrated shroud according to a second embodiment of the present invention.

A second embodiment of the present invention will be described with reference to FIG. 4. In contrast to the first embodiment, in the second embodiment, an extended resinous wall portion 132 is formed in place of the resinous wall portions 131.

The extended resinous wall portion 132 is formed in order to extend a length of the flow of the resin material to the portion corresponding to the casing 120 from the gate portion 116 via the portions corresponding to the motor stay portions 112a and 112b when the shroud 100 is molded.

Specifically, the extended resinous wall portion 132 is disposed between the end portion of the motor stay portion 112a and the end portion of the motor stay portion 112b at the outer periphery side of the ring portion 113. The extended resinous wall portion 132 is a ring-shaped member, which is connected to an end portion of an opposite portion from the motor stay portions of the ring portion 113 (an end portion of the air intake portion 114 side). That is, as shown in FIG. 4, the ring portion 113 and the extended resinous wall portion 132 are configured to form approximately a vertically long U-shaped cross section by a double ring structure so that the motor stay portions 112a and 112b, the ring portion 113 and the extended resinous wall portion 132 are connected in this order. The end portion of the extended resinous wall portion 132 on a side of the motor stay portions 112a, 112b is connected to the flange portion 122 of the opening of the casing 120.

Thereby, when the shroud 100 is molded, the length of the flow of the resin material to the portion corresponding to the casing 120 from a portion corresponding to the center portion of the motor retaining portion 111 can be extended by the length of the extended resinous wall portion 132. Thus, with respect to the resin material filled for forming the casing 120, a quantity of the resin material flowing to the portion corresponding to the casing 120 from the center portion can be made small. Therefore, the welds generated at the casing 120 can be made small, and the cambers generated at the casing 120 can be suppressed.

The extended resinous wall portion 132 is not limited to the ring-shaped resinous wall portion, and a rib-shaped resinous wall portion and a rod-shaped resinous wall portion may be used.

Other Embodiments

It should be understood that the first embodiment and the second embodiment may be combined.

In the above-described embodiments, although the casing-integrated shroud 100 is applied to the electrical blower, in which the fan 200 is rotated by the electrical motor, it is not limited to the configuration. The casing-integrated shroud 100 may be applied to a hydraulic fan, in which the fan 200 is rotated by a hydraulic motor.

Figure 5:
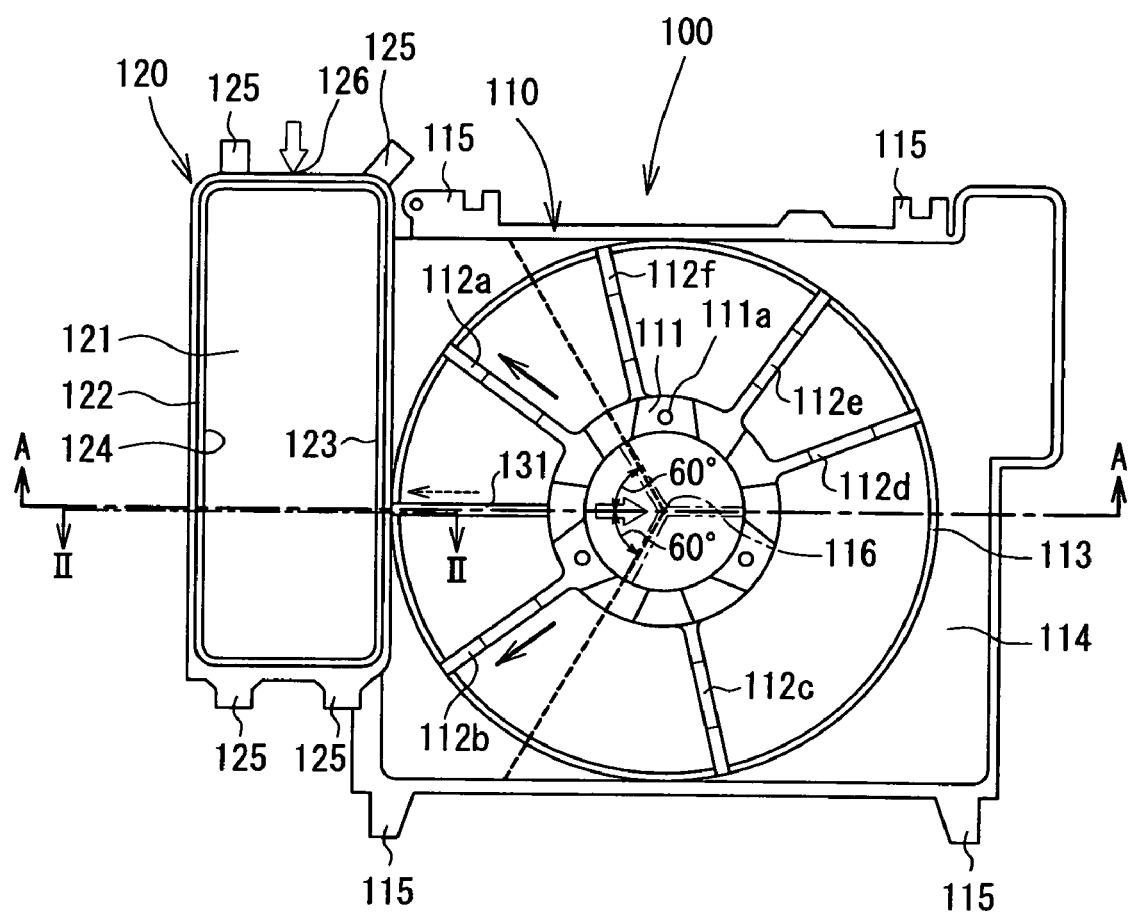
FIG. 5 is front view showing a casing-integrated shroud according to a modified example of the present invention.

Assuming that a reference line A-A is drawn between the center portion of the retaining portion 111 and the casing 120 in a shortest path as shown in FIG. 5, the number of connection portions (i.e., the sum of the motor stay portions 112a to 112f and the resinous wall portion 131) included in a range of ±60° with respect to the line A-A as a center line is four on a plane parallel to the ring portion including the line A-A in the above-described embodiments. However, the number of the connection portions in the present invention is not limited to four. For example, in FIG. 5, the number of the connection portions is three. The number of the connection portions may be three or more (for example, 3, 4, 5, 6 . . . ). In any case that the number of the connection portions is three or more, the same effect with the above-described embodiments can be achieved. Furthermore, at least one of the resinous wall portions 131 used as the connection portion may be formed in parallel to a connection line (see reference line A-A in FIG. 5) connecting the center portion of the retaining portion 111 and the casing 120 in the shortest path, or may be formed to be tilted with respect to the connection line.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A resinous shroud including a fan and an air cleaner, the resinous shroud comprising:
    a retaining portion for retaining a driving portion for driving the fan;
    a plurality of stay portions extended from the retaining portion radially outside;
    a ring portion configured to hold the fan, the ring portion being connected to an end portion of the plurality of stay portions extended from the retaining portion;
    an air intake portion expanded from an outer periphery of the ring portion;
    a casing configured to hold therein a filter element of the air cleaner, the casing being adjacent to the ring portion and integrated with the air intake portion; and
    a resinous wall portion extending from the retaining portion to the ring portion, wherein the retaining portion is molded from a resin material filled by using a first gate portion positioned at a portion corresponding to a center portion of the retaining portion,
    wherein the casing is molded from the resin material filled by using a second gate portion positioned at a portion corresponding to an end portion of the casing, and
    wherein the resinous wall portion and a part of the plurality of stay portions are formed by the resin material flowing from the first gate portion to a portion corresponding to a sidewall of the casing during the resin molding.

2. The resinous shroud according to claim 1,
    wherein the resinous wall portion is a rod-shaped resinous wall portion, which is connected to the casing from the retaining portion.

3. The resinous shroud according to claim 1,
    wherein the resinous wall portion is an extended resinous wall portion for extending a length of the flow of the resin material during the resin molding.

4. The resinous shroud according to claim 1,
    wherein the plurality of stay portions are support members for supporting the retaining portion, and the resinous wall portion is a member for connecting the retaining portion and the ring portion.

5. The resinous shroud according to claim 1,
    wherein the resinous wall portion is located substantially in parallel with a connection line connecting the center portion of the retaining portion and the casing in a shortest path.

6. A resinous shroud including a fan and an air cleaner, the resinous shroud comprising:
    a retaining portion for retaining a driving portion for driving the fan;
    a ring portion configured to hold the fan;
    a plurality of connection portions for connecting the ring portion and the retaining portion, the plurality of connection portions being extended from the retaining portion radially outside to the ring portion;
    an air intake portion expanded from an outer periphery of the ring portion; and
    a casing configured to hold therein a filter element of the air cleaner, the casing being adjacent to the ring portion and integrated with the air intake portion,
    wherein the number of the plurality of connection portions included in a range of plus or minus 60 degrees with respect to a reference line (A-A) as a center line is three or more on a plane parallel to the ring portion including the reference line (A-A), the reference line (A-A) being defined by connecting a center portion of the retaining portion and the casing in a shortest path.

7. The resinous shroud according to claim 6,
    wherein a part of the connection portions is a rod-shaped resinous wall portion, which is connected to the casing from a retaining portion.

8. The resinous shroud according to claim 6,
    wherein a part of the connection portions is an extended resinous wall portion for extending a length of the flow of the resin material during the resin molding.

9. The resinous shroud according to claim 6,
    wherein a part of the connection portions is a support member for supporting the retaining portion, and another part of the connection portions is a member for connecting the retaining portion and the ring portion.

* * * * *